US010407017B2

(12) United States Patent
Markusic et al.

(10) Patent No.: US 10,407,017 B2
(45) Date of Patent: Sep. 10, 2019

(54) VEHICLE SIDE AIRBAG SYSTEM, AND METHODS OF USE AND MANUFACTURE THEREOF

(71) Applicant: Honda Motor Co., Ltd., Tokyo (JP)

(72) Inventors: Craig Markusic, Marysville, OH (US); Murthy Ayyagari, Plain City, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 217 days.

(21) Appl. No.: 15/619,286

(22) Filed: Jun. 9, 2017

(65) Prior Publication Data

US 2018/0354449 A1 Dec. 13, 2018

(51) Int. Cl.
*B60R 21/231* (2011.01)
*B60R 21/207* (2006.01)
*B60R 21/233* (2006.01)
*B60R 21/26* (2011.01)

(52) U.S. Cl.
CPC ...... *B60R 21/23138* (2013.01); *B60R 21/207* (2013.01); *B60R 21/233* (2013.01); *B60R 21/26* (2013.01); *B60R 2021/23146* (2013.01); *B60R 2021/26058* (2013.01)

(58) Field of Classification Search
CPC ............................. B60R 21/207; B60R 21/233
See application file for complete search history.

(56) References Cited

U.S. PATENT DOCUMENTS

| | | | |
|---|---|---|---|
| 5,730,464 A | 3/1998 | Hill | |
| 5,806,923 A | 9/1998 | Tschaeschke et al. | |
| 7,611,164 B2 | 11/2009 | Kai et al. | |
| 8,282,126 B2 * | 10/2012 | Wiik | B60R 21/23138 280/730.2 |
| 8,596,678 B2 | 12/2013 | Ravenberg et al. | |
| 8,651,515 B2 | 2/2014 | Baba et al. | |
| 8,727,375 B2 | 5/2014 | Suzuki | |
| 9,227,590 B2 | 1/2016 | Fujiwara | |
| 2006/0022441 A1* | 2/2006 | Hayashi | B60R 21/207 280/730.2 |
| 2008/0231026 A1* | 9/2008 | Naito | B60R 21/23138 280/730.2 |
| 2009/0020987 A1* | 1/2009 | Wipasuramonton | B60R 21/233 280/729 |
| 2010/0171291 A1* | 7/2010 | Schmidt | B60R 21/23138 280/730.2 |
| 2012/0126518 A1* | 5/2012 | Fukawatase | B60R 21/207 280/730.2 |

(Continued)

*Primary Examiner* — James A English
(74) *Attorney, Agent, or Firm* — Kenealy Vaidya LLP

(57) ABSTRACT

Some embodiments are directed to an airbag assembly for protecting a vehicle occupant having a torso and a pelvis disposed in a vehicle seat. The airbag assembly can include a first inflatable chamber disposed in the vehicle seat and configured to expand outward from the vehicle seat to indirectly support the torso of the occupant. The airbag assembly can also include a second inflatable chamber disposed in the vehicle seat below the first inflatable chamber and configured to expand outward from the vehicle seat below the first inflatable chamber. The airbag assembly can further include a sheet connecting the first inflatable chamber to the second inflatable chamber, the sheet being configured to engage the torso of the occupant when the occupant is disposed in the vehicle seat.

20 Claims, 8 Drawing Sheets

(56) References Cited

U.S. PATENT DOCUMENTS

2015/0048602 A1    2/2015  Gwon et al.
2015/0097359 A1*  4/2015  Rickenbach ...... B60R 21/23138
                                                           280/729
2016/0264091 A1    9/2016  Fujiwara

* cited by examiner

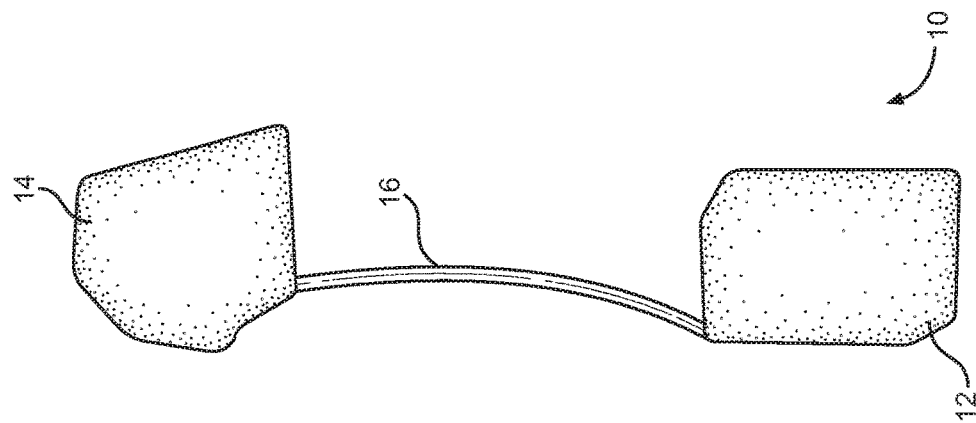
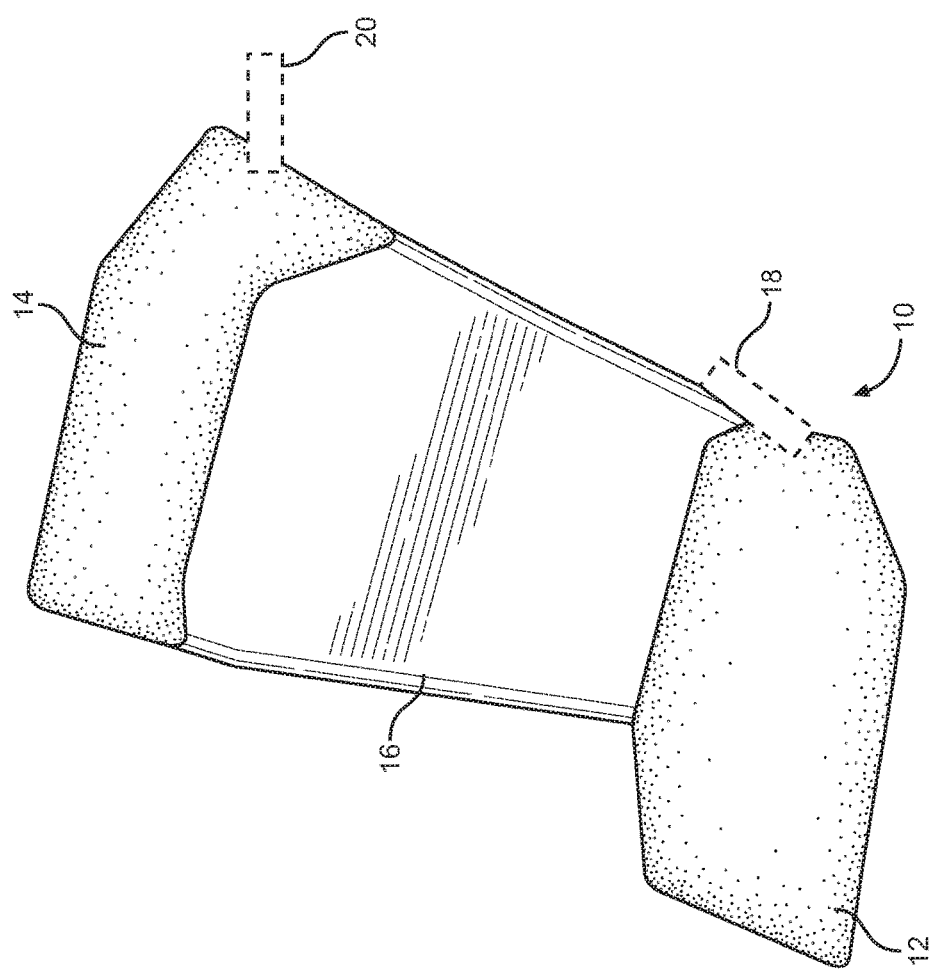

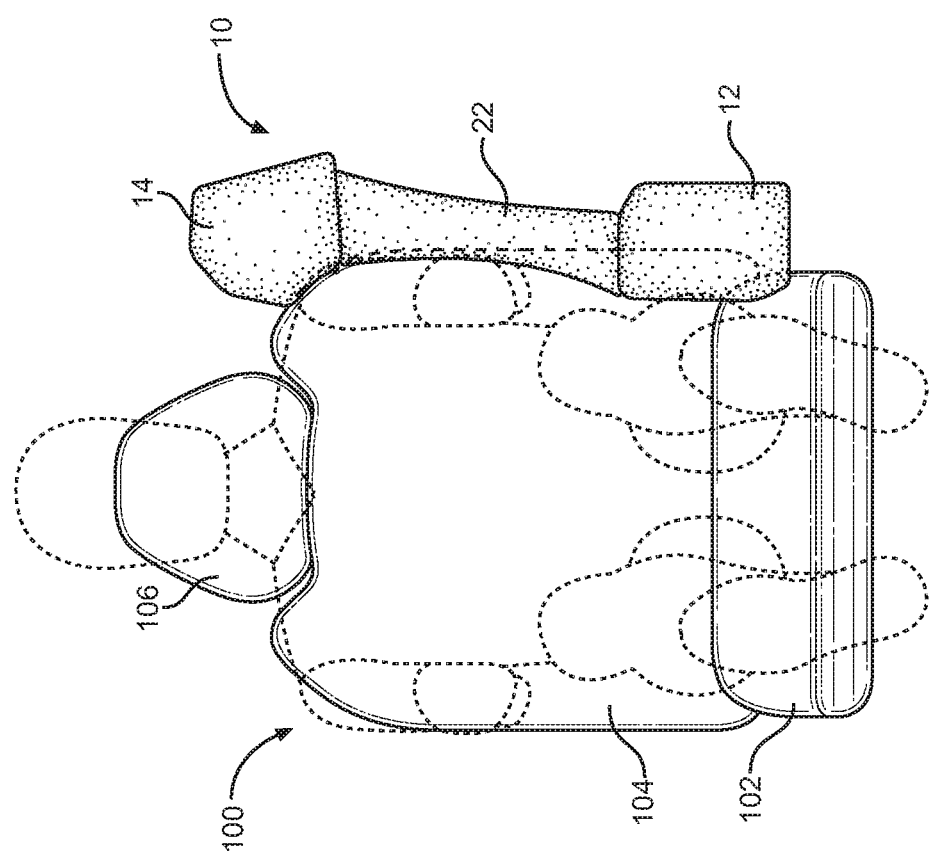

VEHICLE SIDE AIRBAG SYSTEM, AND METHODS OF USE AND MANUFACTURE THEREOF

BACKGROUND

The disclosed subject matter relates to a vehicle side airbag system, and methods of use and manufacture thereof. More particularly, the disclosed subject matter relates to methods and apparatus that separate a vehicle occupant from intruding door structure during a collision.

Vehicle airbag systems, particularly side airbag systems, protect occupants by forming a barrier between an intruding door structure in the event of a side impact collision. Inflatable chambers are used as cushions to protect specific body parts, and the chambers can be stored in and inflated from a vehicle seat. Orientation of the inflatable chambers can affect how specific body parts are shielded to enhance overall occupant protection.

SUMMARY

According to one aspect, an airbag assembly for protecting a vehicle occupant having a torso and a pelvis disposed in a vehicle seat is provided. The airbag assembly can include a first inflatable chamber disposed in the vehicle seat and configured to expand outward from the vehicle seat to indirectly support the torso of the occupant. The airbag assembly can also include a second inflatable chamber disposed in the vehicle seat below the first inflatable chamber and configured to expand outward from the vehicle seat below the first inflatable chamber. The airbag assembly can further include a sheet connecting the first inflatable chamber to the second inflatable chamber, the sheet being configured to engage the torso of the occupant when the occupant is disposed in the vehicle seat.

According to another aspect, an airbag system for protecting a vehicle occupant having a torso and a pelvis disposed in a vehicle seat is provided. The airbag system can include a first inflatable chamber disposed in the vehicle seat and configured to expand outward from the vehicle seat to indirectly support the torso of the occupant. The airbag system can also include a second inflatable chamber disposed in the vehicle seat below the first inflatable chamber and configured to expand outward from the vehicle seat below the first inflatable chamber. The airbag system can further include a sheet connecting the first inflatable chamber to the second inflatable chamber, the sheet being configured to engage the torso of the occupant when the occupant is disposed in the vehicle seat. The airbag system can further include a first inflator disposed in the vehicle seat and configured to inflate the first inflatable chamber. The airbag system can include can further include a second inflator disposed in the vehicle seat and configured to inflate the second inflatable chamber.

According to one aspect, an airbag assembly for protecting a vehicle occupant having a torso and a pelvis disposed in a vehicle seat is provided. The airbag assembly can include a first inflatable chamber disposed in the vehicle seat and configured to expand outward from the vehicle seat to indirectly support the torso of the occupant. The airbag assembly can also include a second inflatable chamber disposed in the vehicle seat below the first inflatable chamber and configured to expand outward from the vehicle seat below the first inflatable chamber. The airbag assembly can further include a third inflatable chamber disposed in the vehicle seat connecting the first inflatable chamber and the second inflatable chamber and configured to expand outward from the vehicle seat between the first inflatable chamber and the second inflatable chamber. The airbag assembly can further include a sheet connecting the first inflatable chamber to the second inflatable chamber, the sheet being configured to engage the torso of the occupant when the occupant is disposed in the vehicle seat.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 1 is a side view of an airbag system for a vehicle seat in a deployed state in accordance with the disclosed subject matter.

FIG. 2 is a front view of the airbag system in the deployed state.

FIG. 10 is a front view of the additional embodiment of the airbag system in the deployed state shown with the vehicle seat.

DETAILED DESCRIPTION OF EXEMPLARY EMBODIMENTS

Figure 3:
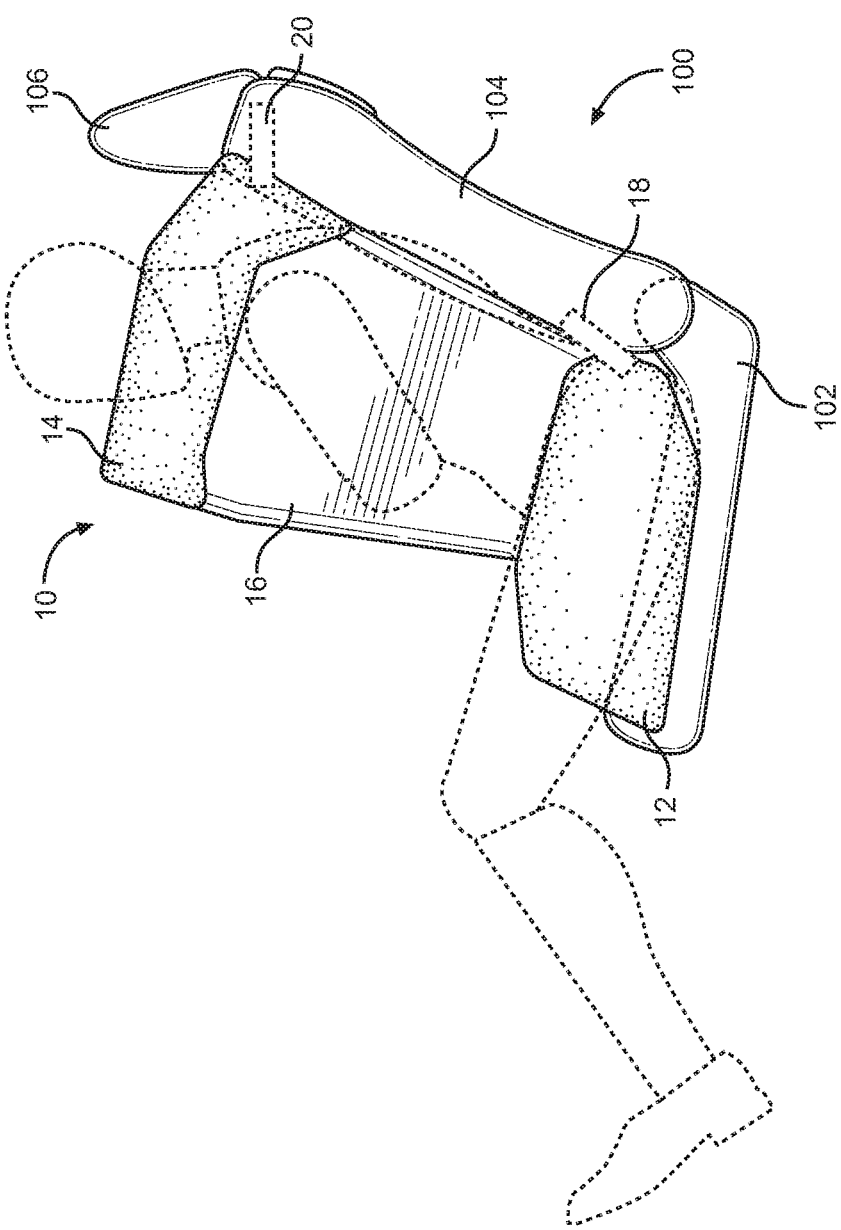
FIG. 3 is a side view of the airbag system in the deployed state shown with an exemplary vehicle seat.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Air Bag System Structure

FIG. 1 is a side view of an airbag system 10 for a vehicle seat in a deployed state in accordance with the disclosed subject matter. In the present embodiment, the airbag system 10 shown is that of a left front passenger seat (i.e., driver side) of a vehicle. However, the exemplary airbag system 10 can be implemented at a right front passenger seat (i.e., passenger side) or left or right rear passenger seats.

The airbag system 10 can include a lower cushion 12 and an upper cushion 14 configured to inflate to the deployed state. The lower and upper cushions 12, 14 can be sealed chambers that are filled with air and expanded from an undeployed state as a result of an impact event such as a collision. The airbag system 10 can also include a sail 16 configured to be opened to the deployed state. The sail 16 can be a sheet extending between the lower and upper cushions 12, 14 that is unfolded from the undeployed state as a result of an impact event such as a collision. The airbag system can further include a lower inflator 18 and an upper inflator 20 configured to inflate the lower cushion 12 and the upper cushion 14, respectively, to the deployed state as a result of an impacted event such as a collision.

The airbag system 10 of FIG. 1 shows the lower and upper cushions 12, 14 and the sail 16 in the deployed state. In the deployed state, the lower and upper cushions 12, 14 have filled with air and expanded to extend through an interior of the vehicle. In the deployed state, the lower and upper cushions 12, 14 are elongated and anchored at the lower and upper inflators 18, 20, respectively. The inflators 18, 20 are positioned along a common side of the airbag system 10, and both the lower and upper cushions 12, 14 extend away from the inflators 18, 20 in substantially similar directions (i.e., forward through the interior of the vehicle). The sail 16 is substantially opened and unfolded in this state, spanning along a lower side of the upper cushion 14 and an upper side of the lower cushion 12. In the present embodiment, the sale 16 can extend along substantially an entirety of the lower side of the upper cushion 14, and extend along a portion of the upper side of the lower cushion 12. Other embodiments of the airbag system 10 may include the sail 16 extending further or shorter along either or both of the lower and upper cushions 12, 14.

FIG. 2 is a front view of the airbag system 10 in the deployed state. As described above, in the deployed state, the lower and upper cushions 12, 14 have filled with air and expanded to extend through an interior of the vehicle. The lower and upper cushions 12, 14 expand in a width direction when inflated with air to space an occupant from a door of the vehicle during an impact even such as a collision, as will be described below. The sail 16, however, does not inflate or fill with air and maintains a thin, sheet-like profile in the width direction during an impact even such as a collision. In the deployed state, the sail 16 is relatively taught spanning between the lower and upper cushions 12, 14. The sail 16 is anchored at inner edges of lower and upper cushions 12, 14 nearer a seat of the vehicle and spaced from an intruding door. This disposition of the sail 16 is to contact and support an occupant during an impact even such as a collision, as will be described below.

FIG. 3 is a side view of the airbag system 10 in the deployed state shown with an exemplary vehicle seat 100. As described above, in the deployed state, the lower and upper cushions 12, 14 have filled with air and expanded forward from the seat 100 around an occupant.

In the present embodiment, an occupant is shown positioned in an exemplary seat 100. Shown in FIG. 3 is a front left seat (i.e., driver side). The seat 100 includes a seat bottom 102, a seatback 104 and a headrest 106. The occupant is positioned in the seat 100 such that the seat bottom 102 supports a pelvis of the occupant, and the seatback 104 supports a torso of the occupant.

The airbag system 10 shown in FIG. 3 is disposed on a side of the seat 100 proximate a vehicle door. There airbag system 10 is thereby configured to extend from the seat 100 between an occupant and the door to form a barrier therebetween during an impact event such as a collision. The exemplary airbag system 10 therefore includes the lower and upper inflators 18, 20 disposed in a left side of the seatback 104. Specifically, the lower inflator 18 is disposed inside the seatback 104 at position proximate the seat bottom 102, and the upper inflator 20 is disposed inside the seatback 104 at a position proximate the headrest 106. In this manner, the lower and upper inflators 18, 20 are spaced apart from one another.

In the deployed state as shown, the lower and upper cushions 12, 14, and the sail 16 spanning therebetween extend around a left side of an occupant positioned in the seat 100. The airbag system 10 thereby surrounds and shields a left side of an occupant from an intruding door of a vehicle during an impact even such as a collision. As will be described below, the airbag system 10 specifically shields a torso and a pelvis of an occupant from an intruding door.

The upper cushion 14 is positioned at an upper portion of the seatback 104 and configured to expand forward of the seatback 104 and near a torso of the occupant. Specifically, the upper cushion 14 expands around a shoulder of the occupant without directly engaging an occupant's shoulder. Instead, the sail 16 suspended between the upper cushion 14 and the lower cushion 12 is configured to engage the shoulder of an occupant.

The sail 16 is attached to the lower side of the upper cushion 14 and suspended therefrom. The sail 16 is also attached to the upper side of the lower cushion 12 and anchored thereat. By being connected to both the upper and lower cushions 12, 14, the sail 16 is stretched relatively tightly therebetween, and is therefore configured to support an occupant's torso. Extending from the upper cushion 14 to the lower cushion 12, the sail 16 substantially covers a left side of the occupant's torso to form a barrier between a door to shield the occupant during an impact event such as a collision. The occupant's torso can include a shoulder, arm, abdomen, etc., or any other body part supported by or adjacent the seatback 104 of the seat 100. Additionally, because the lower and upper cushions 12, 14 are connected to and anchored at the side of the seatback 104, the sail 16 is substantially held in place. The sail 16 also extends forward further than an occupant's torso in the deployed state. Specifically, a front edge of the sail 16 is disposed beyond a front most portion of an occupant's torso.

The lower cushion 12 is positioned at a lower portion of the seatback 104 and configured to expand forward of the seatback 104 and near a pelvis of the occupant. The lower cushion 12 extends along an upper portion of the seat bottom 102, substantially a length of the seat bottom 102, to support an occupant's pelvis. The lower cushion 12 also expands upward to extend in a height direction approximately a height of an occupant's pelvis or height of an occupant's legs when seated in the seat 100. Specifically, the lower cushion 12 expands around a pelvis of the occupant directly engaging an occupant's pelvis. The lower cushion 12 is therefore configured to support an occupant's pelvis during an impact event such as a collision, forming a barrier between an intruding door to support an occupant's pelvis.

In the present embodiment, the airbag structure 10 can be packaged as a single unit stored in the seatback 104 of the seat 100. For example, the lower and upper cushions 12, 14 and the sail 16 can be packaged together around the lower and upper inflators 18, 20. Other embodiments of the airbag structure 10 may include components of the airbag structure 10 packaged as separate units and/or parts.

Figure 4:
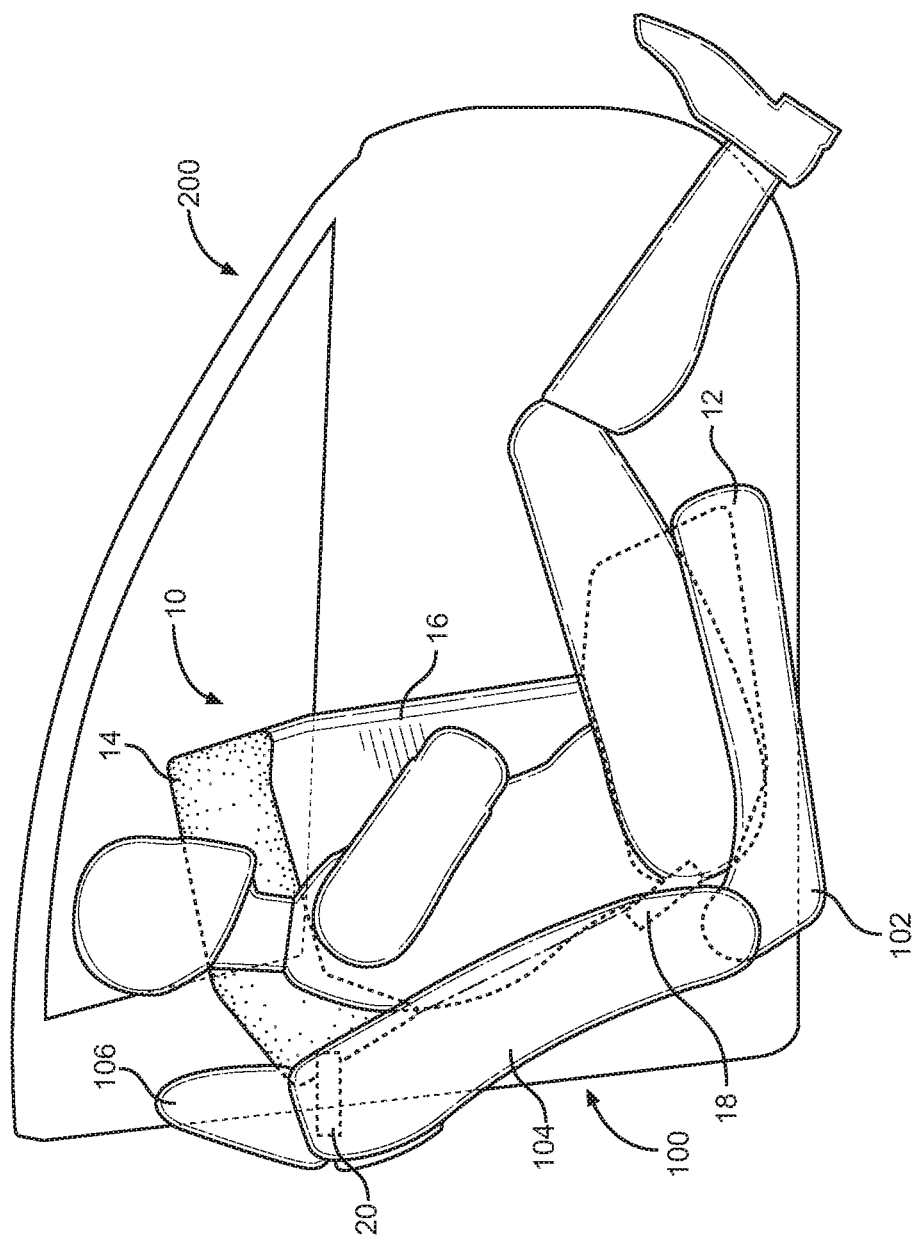
FIG. 4 is a side view of the airbag system in the deployed state shown with the vehicle seat and an exemplary vehicle door.

FIG. 4 is a side view of the airbag system 10 in the deployed state shown with the vehicle seat 100 and an exemplary vehicle door 200. The airbag system 10 shown in FIG. 4 is disposed on a side of the seat 100 proximate the door 200 of the vehicle. The airbag system 10 is thereby configured to extend from the seat 100 between an occupant and the door 200 to form a barrier therebetween during an impact event such as a collision. As described above, in the deployed state, the lower and upper cushions 12, 14 have filled with air and expanded forward from the seat 100 around an occupant.

In the deployed state as shown, the lower and upper cushions 12, 14, and the sail 16 spanning therebetween extend around a left side of an occupant positioned in the seat 100. The airbag system 10 thereby surrounds and shields a left side of an occupant from the door 200 of a vehicle should the door intrude into the interior (i.e., cabin) of the vehicle during an impact even such as a collision. As will be described below, the airbag system 10 specifically shields a torso and a pelvis of an occupant from the door 200.

In the present embodiment, an occupant is shown positioned in an exemplary seat 100. Shown in FIG. 4 is a front left seat (i.e., driver side). The seat 100 is shown from a right side facing the interior of the vehicle. The airbag system 10 is shown in the deployed state extending between an occupant and the door 200 such that a portion of the airbag system 10 is obstructed from view by an occupant.

The airbag system 10 shown in FIG. 4 is disposed on a side of the seat 100 proximate the door 200. The airbag system 10 is thereby configured to extend from the seat 100 between an occupant and the door 200 to form a barrier therebetween during an impact event such as a collision. The exemplary airbag system 10 therefore includes the lower and upper inflators 18, 20 disposed in a left side of the seatback 104 (not shown).

In the deployed state as shown, the lower and upper cushions 12, 14, and the sail 16 spanning therebetween extend around a left side (far side) of an occupant positioned in the seat 100. The airbag system 10 thereby surrounds and shields a left side of an occupant from the door 100 that intrudes into the interior of the vehicle towards an occupant during an impact even such as a collision. As will be described below, the airbag system 10 specifically shields a torso and a pelvis of an occupant from intrusion of the door 200.

The upper cushion 14 is positioned at an upper portion of the seatback 104 and configured to expand forward of the seatback 104 and near a torso of the occupant. Specifically, the upper cushion 14 expands around a shoulder of the occupant without directly engaging an occupant's shoulder. Instead, the sail 16 suspended between the upper cushion 14 and the lower cushion 12 is configured to engage the shoulder of an occupant. The upper cushion 14, in the deployed state, extends at a slight angle upward from the seatback 104 towards a front of the vehicle. The upper cushion 14 thereby extends around an occupant's neck, and part of an occupant's head. The upper cushion 14 therefore forms a partial barrier between an occupant's head and neck and the door 200 during an impact event such as a collision. As shown, the upper cushion 14 extends proximate a beltline of the door 200. However, other embodiments of the airbag system 10 may feature the upper cushion 14 extending above or below the beltline of the door 200 in the deployed state.

The sail 16 is attached to the lower side of the upper cushion 14 and suspended therefrom. The sail 16 is also attached to the upper side of the lower cushion 12 and anchored thereat. By being connected to both the upper and lower cushions 12, 14, the sail 16 is stretched relatively tightly therebetween, and is therefore configured to support an occupant's torso. Extending from the upper cushion 14 to the lower cushion 12, the sail 16 substantially covers a left side of the occupant's torso (obstructed from view) to form a barrier between the door 200 to shield the occupant during an impact event such as a collision. The occupant's torso can include a shoulder, arm, abdomen, etc., or any other body part supported by or adjacent the seatback 104 of the seat 100. As described above, because the lower and upper cushions 12, 14 are connected to and anchored at the side of the seatback 104, the sail 16 is substantially held in place. The sail 16 also extends forward further than an occupant's torso in the deployed state. Specifically, a front edge of the sail 16 is disposed beyond a front most portion of an occupant's torso.

The lower cushion 12 is positioned at a lower portion of the seatback 104 and configured to expand forward of the seatback 104 and near a pelvis of the occupant. The lower cushion 12 extends along an upper portion of the seat bottom 102, and is obstructed from view. The lower cushion 12 is therefore configured to support an occupant's pelvis during an impact event such as a collision, forming a barrier between an intruding door to support an occupant's pelvis.

Figure 5:
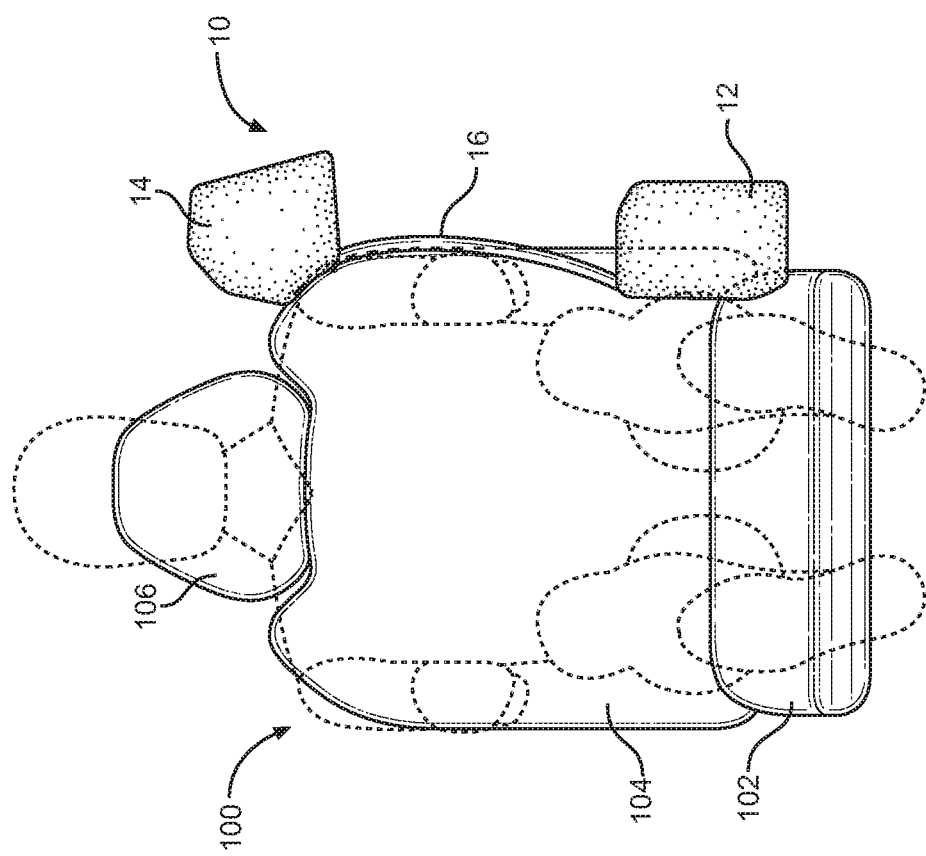
FIG. 5 is a front view of the airbag system in the deployed state shown with the vehicle seat.

FIG. 5 is a front view of the airbag system 10 in the deployed state shown with the vehicle seat 100. As shown in FIG. 5, the airbag system 10 includes the lower and upper cushions 12, 14 and the sail 16 extending therebetween in the deployed state.

As described above, the upper cushion 14 inflates to surround without directly engaging the torso, specifically the shoulder, of an occupant. The sail 16 is suspended from the lower side of the upper cushion 14 to directly engage the torso (i.e., shoulder) of an occupant and thereby provide support during an impact even such as a collision. As shown in FIG. 5, the sail 16 is configured to extend close to the torso of an occupant in the deployed state.

Also described above, the lower cushion 12 inflates to surrounding and directly engage the pelvis of an occupant. The lower cushion 12 provides an anchor for the sail 16 to stabilize unfolding and positioning of the sail 16 in the deployed state, maintaining position of the sail 16 against the torso of an occupant.

II. Operation

The exemplary airbag system 10 described above and illustrated in FIGS. 1-5 includes the lower and upper cushions 12, 14, the sail 16 and the lower and upper inflators 18, 20. The airbag system 10 serves to expand and cover a side of an occupant nearest an impact event such as a collision to form a barrier between the occupant and the door 200 of the vehicle, which can intrude into the interior and collide with the occupant.

Upon an occurrence of an impact event, for example another vehicle colliding with either a driver side or a passenger side of the vehicle, the airbag system 10 will be actuated. During actuation of the airbag system 10, the inflators 18, 20 separately inflate the lower and upper cushions 12, 14, respectively, which burst out of the seatback 104 of the seat 100 as they are filled with air and expand. The lower cushion 12 expands along the pelvis of an occupant in the seat 100 between the door 200 while the upper cushion 14 expands around the shoulder of the occupant between the door 200. As the lower and upper cushions 12, 14 inflate and expand, the sail 16 is unfolded and stretched to extend between the inflated lower and upper cushions 12, 14. The sail 16 is suspended form the upper cushion 14 and anchored at the lower cushion 12, covering the torso, including the shoulder, of the occupant. Once fully inflated and expanded, the airbag system 10 is in the deployed state and the lower and upper cushions 12, 14 and the sail 16 form a barrier around the occupant to guard the occupant from intruding portions of the door 200 that intrude into a passenger area of the interior of the vehicle. The torso and pelvis can thereby be loaded by the lower cushion 12 and the sail 16 to provide torso and pelvis support and delay contact with the door 200. Coupling of the occupant's torso and pelvis to the door 200 is thereby impeded by the airbag system 10.

III. Air Bag System Structure with Vertical Cushion

FIGS. 6-10 illustrate an additional embodiment of the airbag system 10 with an additional third cushion configured as a forward vertical stabilizer.

Figure 6:
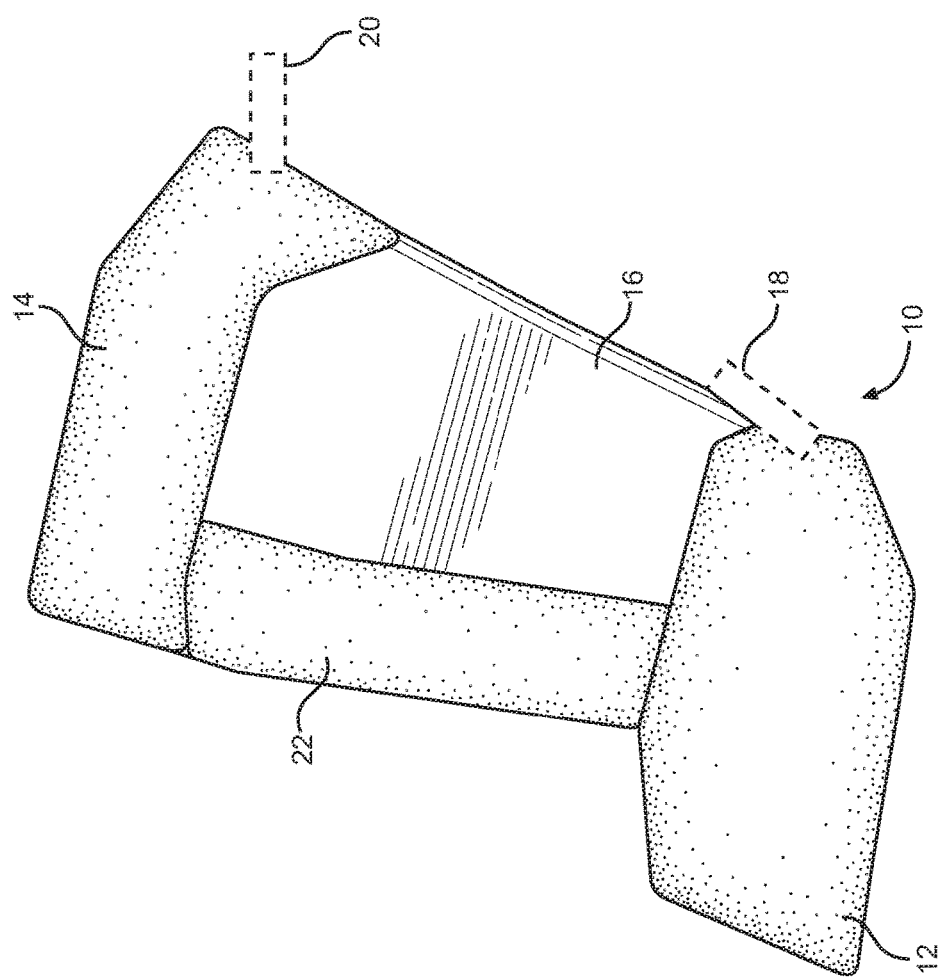
FIG. 6 is a side view of an airbag system for a vehicle seat in a deployed state in accordance with an additional embodiment.

FIG. 6 is a side view of the airbag system 10 for a vehicle seat in a deployed state in accordance with the additional embodiment. In the additional embodiment, the airbag system 10 shown is that of a left front passenger seat (i.e., driver side) of a vehicle. However, the airbag system 10 can be implemented at a right front passenger seat (i.e., passenger side) or left or right rear passenger seats.

The airbag system 10 can include a lower cushion 12, an upper cushion 14 and an intermediate cushion 22 configured to inflate to the deployed state. The lower, upper, and intermediate cushions 12, 14, 22 can be sealed chambers that are filled with air and expanded from an undeployed state as a result of an impact event such as a collision. The airbag system 10 can also include a sail 16 configured to be opened to the deployed state. The sail 16 can be a sheet extending between the lower and upper cushions 12, 14 and along the intermediate cushion 22 that is unfolded from the undeployed state as a result of an impact event such as a collision. The airbag system can further include a lower inflator 18 and an upper inflator 20 configured to inflate the lower cushion 12 and the upper cushion 14, respectively, to the deployed state as a result of an impacted event such as a collision. Either or both of the lower and upper cushions 12, 14 can be connected to the intermediate cushion 22 such that inflating the lower cushion 12 and/or the upper cushion 14 also inflates the intermediate cushion 22.

The airbag system 10 of FIG. 1 shows the lower, upper and intermediate cushions 12, 14, 22 and the sail 16 in the deployed state. In the deployed state, the lower, upper and intermediate cushions 12, 14, 22 have filled with air and expanded to extend through an interior of the vehicle. In the deployed state, the lower and upper cushions 12, 14 are elongated and anchored at the lower and upper inflators 18, 20, respectively, and the intermediate cushion 22 is elongated (vertically) and anchored at forward ends of the lower and upper cushions 12, 14. The inflators 18, 20 are positioned along a common side of the airbag system 10, and both the lower and upper cushions 12, 14 extend away from the inflators 18, 20 in substantially similar directions (i.e., forward through the interior of the vehicle). The intermediate cushion 22 extends between the forward ends of the lower and upper cushions 12, 14 in a direction substantially perpendicular to those in which the lower and upper cushions 12, 14 extend. The sail 16 is substantially opened and unfolded in this state, spanning along a lower side of the upper cushion 14 and an upper side of the lower cushion 12, with a forward edge of the sail spanning along either a forward side or a rearward side of the intermediate cushion 22. In the additional embodiment, the sail 16 can extend along substantially an entirety of the lower side of the upper cushion 14, and extend along a portion of the upper side of the lower cushion 12. Other embodiments of the airbag system 10 may include the sail 16 extending further or shorter along either or both of the lower and upper cushions 12, 14. Similarly, the sail 16 can extend along substantially an entirety of the intermediate cushion 22. Other additional embodiments of the airbag system 10 may include the sail 16 extending further or shorter along the intermediate cushion 22.

Figure 7:
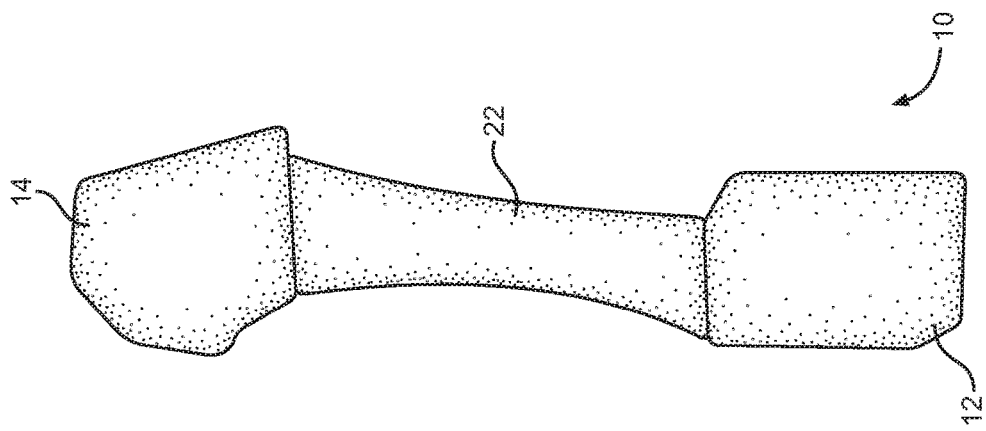
FIG. 7 is a front view of the additional embodiment of the airbag system in the deployed state.

FIG. 7 is a front view of the additional embodiment of the airbag system 10 in the deployed state. As described above, in the deployed state, the lower, upper and intermediate cushions 12, 14, 22 have filled with air and expanded to extend through an interior of the vehicle. The lower, upper and intermediate cushions 12, 14, 22 expand in a width direction when inflated with air to space an occupant from a door of the vehicle during an impact even such as a collision, as will be described below. The sail 16, however, does not inflate or fill with air and maintains a thin, sheet-like profile in the width direction during an impact even such as a collision. In the deployed state, the sail 16 is relatively taught spanning between the lower, upper and intermediate cushions 12, 14, 22. The sail 16 is anchored at inner edges of the lower and upper cushions 12, 14 nearer a seat of the vehicle, and at a rear edge of the intermediate cushion 22, and spaced from an intruding door. This disposition of the sail 16 is to contact and support an occupant during an impact even such as a collision, as will be described below.

Figure 8:
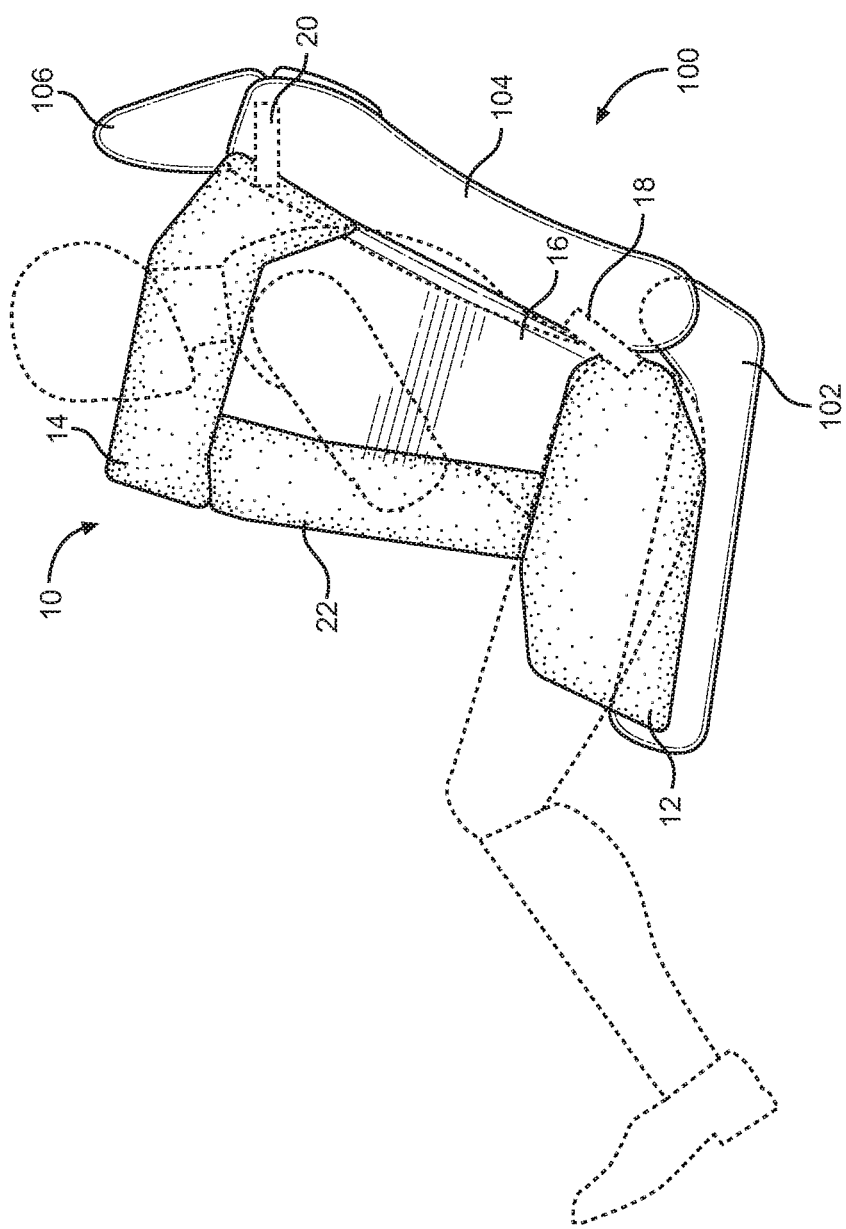
FIG. 8 is a side view of the additional embodiment of the airbag system in the deployed state shown with an exemplary vehicle seat.

FIG. 8 is a side view of the additional embodiment of the airbag system 10 in the deployed state shown with an exemplary vehicle seat 100. As described above, in the deployed state, the lower, upper and intermediate cushions 12, 14, 22 have filled with air and expanded forward from the seat 100 around an occupant.

In the additional embodiment, an occupant is shown positioned in an exemplary seat 100. Shown in FIG. 8 is a front left seat (i.e., driver side). The seat 100 includes a seat bottom 102, a seatback 104 and a headrest 106. The occupant is positioned in the seat 100 such that the seat bottom 102 supports a pelvis of the occupant, and the seatback 104 supports a torso of the occupant.

The additional embodiment of the airbag system 10 shown in FIG. 8 is disposed on a side of the seat 100 proximate a vehicle door. The airbag system 10 is thereby configured to extend from the seat 100 between an occupant and the door to form a barrier therebetween during an impact event such as a collision. The airbag system 10 therefore includes the lower and upper inflators 18, 20 disposed in a left side of the seatback 104. Specifically, the lower inflator 18 is disposed inside the seatback 104 at position proximate the seat bottom 102, and the upper inflator 20 is disposed inside the seatback 104 at a position proximate the headrest 106. In this manner, the lower and upper inflators 18, 20 are spaced apart from one another.

In the deployed state as shown, the lower, upper and intermediate cushions 12, 14, 22 and the sail 16 spanning therebetween extend around a left side of an occupant positioned in the seat 100. The airbag system 10 thereby surrounds and shields a left side of an occupant from an intruding door of a vehicle during an impact even such as a collision. As will be described below, the airbag system 10 specifically shields a torso and a pelvis of an occupant from an intruding door.

The upper cushion 14 is positioned at an upper portion of the seatback 104 and configured to expand forward of the seatback 104 and near a torso of the occupant. Specifically, the upper cushion 14 expands around a shoulder of the occupant without directly engaging an occupant's shoulder. Instead, the sail 16 suspended between the upper cushion 14 and the lower cushion 12 is configured to engage the shoulder of an occupant. The intermediate cushion 22 is positioned forward of the seatback 104 and configured to expand vertically between the lower and upper cushions 12, 14 to stabilize them. In this way, the intermediate cushion 22 helps maintain proper positioning of the lower and upper cushions 12, 14 around the occupant. Some portions of the intermediate cushion 22 may additionally engage or support the occupant.

The sail 16 is attached to the lower side of the upper cushion 14 and suspended therefrom. The sail 16 is also attached to the upper side of the lower cushion 12 and anchored thereat. The sail 16 may be additionally attached to the forward or rearward sides of the intermediate cushion 22 for additional support. By being connected to both the upper and lower cushions 12, 14, and even the intermediate cushion 22, the sail 16 is stretched relatively tightly therebetween, and is therefore configured to support an occupant's torso. Extending from the upper cushion 14 to the lower cushion 12, and to the intermediate cushion 22, the sail 16 substantially covers a left side of the occupant's torso to form a barrier between a door to shield the occupant during an impact event such as a collision. The occupant's torso can include a shoulder, arm, abdomen, etc., or any other body part supported by or adjacent the seatback 104 of the seat 100. Additionally, because the lower and upper cushions 12, 14 are connected to and anchored at the side of the seatback 104, the sail 16 is substantially held in place. The sail 16 also extends forward further than an occupant's torso to the intermediate cushion 22 in the deployed state. Specifically, a front edge of the sail 16 is disposed beyond a front most portion of an occupant's torso.

The lower cushion 12 is positioned at a lower portion of the seatback 104 and configured to expand forward of the seatback 104 and near a pelvis of the occupant. The lower cushion 12 extends along an upper portion of the seat bottom 102, substantially a length of the seat bottom 102, to support an occupant's pelvis. The lower cushion 12 also expands upward to extend in a height direction approximately a height of an occupant's pelvis or height of an occupant's legs when seated in the seat 100. Specifically, the lower cushion 12 expands around a pelvis of the occupant directly engaging an occupant's pelvis. The lower cushion 12 is therefore configured to support an occupant's pelvis during an impact event such as a collision, forming a barrier between an intruding door to support an occupant's pelvis.

In the additional embodiment, the airbag structure 10 can be packaged as a single unit stored in the seatback 104 of the seat 100. For example, the lower, upper and intermediate cushions 12, 14, 22 and the sail 16 can be packaged together around the lower and upper inflators 18, 20. Other embodiments of the airbag structure 10 may include components of the airbag structure 10 packaged as separate units and/or parts.

Figure 9:
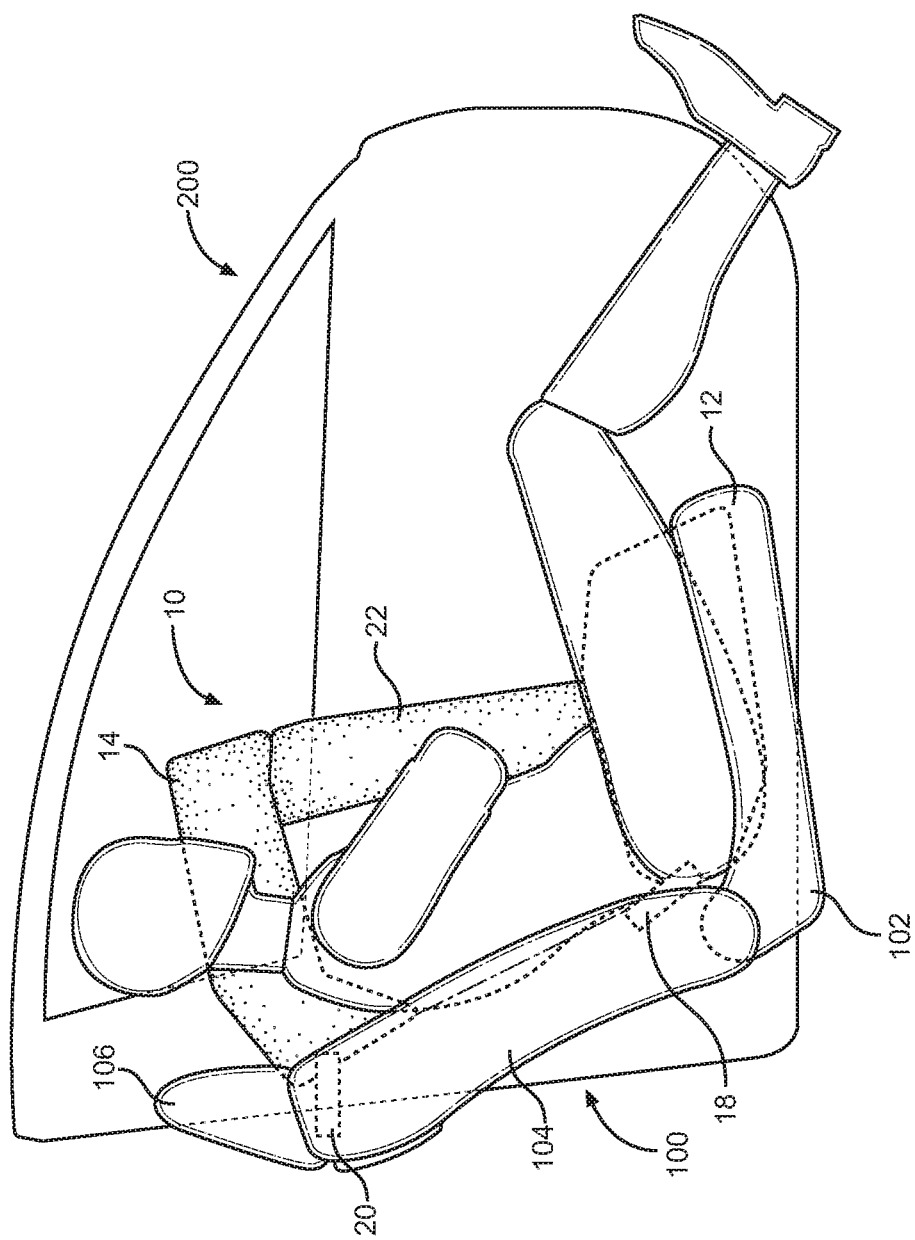
FIG. 9 is a side view of the additional embodiment of the airbag system in the deployed state shown with the vehicle seat and an exemplary vehicle door.

FIG. 9 is a side view of the additional embodiment of the airbag system 10 in the deployed state shown with the vehicle seat 100 and an exemplary vehicle door 200. The airbag system 10 shown in FIG. 4 is disposed on a side of the seat 100 proximate the door 200 of the vehicle. The airbag system 10 is thereby configured to extend from the seat 100 between an occupant and the door 200 to form a barrier therebetween during an impact event such as a collision. As described above, in the deployed state, the lower, upper and intermediate cushions 12, 14, 22 have filled with air and expanded forward from the seat 100 around an occupant.

In the deployed state as shown, the lower, upper and intermediate cushions 12, 14, 22, and the sail 16 spanning therebetween extend around a left side of an occupant positioned in the seat 100. The airbag system 10 thereby surrounds and shields a left side of an occupant from the door 200 of a vehicle should the door intrude into the interior (i.e., cabin) of the vehicle during an impact even such as a collision. As will be described below, the airbag system 10 specifically shields a torso and a pelvis of an occupant from the door 200.

In the additional embodiment, an occupant is shown positioned in an exemplary seat 100. Shown in FIG. 9 is a front left seat (i.e., driver side). The seat 100 is shown from a right side facing the interior of the vehicle. The airbag system 10 is shown in the deployed state extending between an occupant and the door 200 such that a portion of the airbag system 10 is obstructed from view by an occupant.

The airbag system 10 shown in FIG. 9 is disposed on a side of the seat 100 proximate the door 200. The airbag system 10 is thereby configured to extend from the seat 100 between an occupant and the door 200 to form a barrier therebetween during an impact event such as a collision. The airbag system 10 therefore includes the lower and upper inflators 18, 20 disposed in a left side of the seatback 104 (not shown).

In the deployed state as shown, the lower, upper and intermediate cushions 12, 14, 22, and the sail 16 spanning therebetween extend around a left side (far side) of an occupant positioned in the seat 100. The airbag system 10 thereby surrounds and shields a left side of an occupant from the door 100 that intrudes into the interior of the vehicle towards an occupant during an impact even such as a collision. As will be described below, the airbag system 10 specifically shields a torso and a pelvis of an occupant from intrusion of the door 200.

The upper cushion 14 is positioned at an upper portion of the seatback 104 and configured to expand forward of the seatback 104 and near a torso of the occupant. Specifically, the upper cushion 14 expands around a shoulder of the occupant without directly engaging an occupant's shoulder. Instead, the sail 16 suspended between the upper cushion 14 and the lower cushion 12 is configured to engage the shoulder of an occupant. The upper cushion 14, in the deployed state, extends at a slight angle upward from the seatback 104 towards a front of the vehicle. The upper cushion 14 thereby extends around an occupant's neck, and part of an occupant's head. The upper cushion 14 therefore forms a partial barrier between an occupant's head and neck and the door 200 during an impact event such as a collision. As shown, the upper cushion 14 extends proximate a beltline of the door 200. However, other embodiments of the airbag system 10 may feature the upper cushion 14 extending above or below the beltline of the door 200 in the deployed state.

The sail 16 is attached to the lower side of the upper cushion 14 and suspended therefrom. The sail 16 is also attached to the upper side of the lower cushion 12 and anchored thereat. The sail 16 can further be attached to the forward or rearward side of the intermediate cushion 22 for stabilization. By being connected to both the lower, upper and intermediate cushions 12, 14, 22, the sail 16 is stretched relatively tightly therebetween, and is therefore configured to support an occupant's torso. Extending from the upper cushion 14 to the lower cushion 12 and along the intermediate cushion 22, the sail 16 substantially covers a left side of the occupant's torso (obstructed from view) to form a barrier between the door 200 to shield the occupant during an impact event such as a collision. The occupant's torso can include a shoulder, arm, abdomen, etc., or any other body part supported by or adjacent the seatback 104 of the seat 100. As described above, because the lower and upper cushions 12, 14 are connected to and anchored at the side of the seatback 104, and the intermediate cushion 22 is connected to the lower and upper cushions 12, 14, the sail 16 is substantially held in place. The sail 16 also extends forward further than an occupant's torso to the intermediate cushion 22 in the deployed state. Specifically, a front edge of the sail 16 is disposed beyond a front most portion of an occupant's torso.

The lower cushion 12 is positioned at a lower portion of the seatback 104 and configured to expand forward of the seatback 104 and near a pelvis of the occupant. The lower cushion 12 extends along an upper portion of the seat bottom 102, and is obstructed from view. The lower cushion 12 is therefore configured to support an occupant's pelvis during an impact event such as a collision, forming a barrier between an intruding door to support an occupant's pelvis.

The intermediate cushion 22 is configured to expand forward of the seatback 104 between the lower and upper cushions 12, 14 and substantially forward of the occupant's torso. When inflated, the intermediate cushion 22 extends from an upper portion of the seat bottom 102, and is partially obstructed from view. The intermediate cushion 22 is therefore configured to stabilize the lower and upper cushions 12, 14, and the sail 16 during an impact event such as a collision, forming a sturdy support member to maintain proper position of the airbag system 10 in the deployed state.

FIG. 10 is a front view of the additional embodiment of the airbag system 10 in the deployed state shown with the vehicle seat 100. As shown in FIG. 10, the airbag system 10 includes the lower, upper and intermediate cushions 12, 14, 22 and the sail 16 extending therebetween in the deployed state.

As described above, the upper cushion 14 inflates to surround without directly engaging the torso, specifically the shoulder, of an occupant. The sail 16 is suspended from the lower side of the upper cushion 14 to directly engage the torso (i.e., shoulder) of an occupant and thereby provide support during an impact even such as a collision. As shown in FIG. 10, the sail 16 is configured to extend close to the torso of an occupant in the deployed state.

Also described above, the lower cushion 12 inflates to surround and directly engage the pelvis of an occupant. The lower cushion 12 provides an anchor for the sail 16 to stabilize unfolding and positioning of the sail 16 in the deployed state, maintaining position of the sail 16 against the torso of an occupant.

Additionally described above, the intermediate cushion 22 inflates to extend between and stabilize the lower and upper cushions 12, 14, as well as the sail 16. The intermediate cushion 22 provides support for forward ends of the lower and upper cushions 12, 14 in the deployed state, and helps stabilize unfolding and positioning of the sail 16, maintaining position of components of the airbag system 10 around an occupant.

IV. Operation with Vertical Cushion

The exemplary airbag system 10 described above and illustrated in FIGS. 1-5 includes the lower, upper and intermediate cushions 12, 14, 22, the sail 16 and the lower and upper inflators 18, 20. The additional embodiment of the airbag system 10 serves to expand and cover a side of an occupant nearest an impact event such as a collision to form a barrier between the occupant and the door 200 of the vehicle, which can intrude into the interior and collide with the occupant.

Upon an occurrence of an impact event, for example another vehicle colliding with either a driver side or a passenger side of the vehicle, the airbag system 10 will be actuated. During actuation of the airbag system 10, the inflators 18, 20 separately inflate the lower and upper cushions 12, 14, respectively, which burst out of the seatback 104 of the seat 100 as they are filled with air and expand. The intermediate cushion 22 is also inflated at connected portions of the lower cushion 12 and/or the upper cushion 14 by air from the inflator(s) 18, 20 passing through the lower and upper cushions 12, 14. The lower cushion 12 expands along the pelvis of an occupant in the seat 100 between the door 200 while the upper cushion 14 expands around the shoulder of the occupant between the door 200. The intermediate cushion 22 expands vertically between forward ends of the lower and upper cushions 12, 14. As the lower, upper and intermediate cushions 12, 14, 22 inflate and expand, the sail 16 is unfolded and stretched to extend between them. The sail 16 is suspended form the upper cushion 14 and anchored at the lower cushion 12, covering the torso, including the shoulder, of the occupant. The sail 16 can further be pulled taught by the intermediate cushion 22. Once fully inflated and expanded, the airbag system 10 is in the deployed state and the lower, upper and intermediate cushions 12, 14, 22 and the sail 16 form a barrier around the occupant to guard the occupant from intruding portions of the door 200 that intrude into a passenger area of the interior of the vehicle. The torso and pelvis can thereby be loaded by the lower cushion 12 and the sail 16 to provide torso and pelvis support and delay contact with the door 200. Coupling of the occupant's torso and pelvis to the door 200 is thereby impeded by the airbag system 10, and the airbag system 10 maintains proper positioning around the occupant.

V. Alternative Embodiments

While certain embodiments of the invention are described above, and FIGS. 1-10 disclose the best mode for practicing the various inventive aspects, it should be understood that the invention can be embodied and configured in many different ways without departing from the spirit and scope of the invention.

For example, embodiments are disclosed above in the context of an airbag structure configured to be packaged in and expand from a seat of a vehicle shown in FIGS. 3-5 and 8-10. However, embodiments are intended to include or otherwise cover any type of airbag structure disclosed above.

Specifically, the exemplary and additional embodiments of the airbag structure 10 is shown installed in a front left (i.e., driver's side) seat of a vehicle. This is for exemplary purposes, and the airbag structure 10 can be installed in any vehicle seat including a front right passenger seat or any rear passenger seat of a vehicle.

The airbag structure 10 is also not limited to implementation with vehicle doors. For example, embodiments of the airbag structure 10 disclosed above can be configured to expand from door panels as well as seats. Specifically, the airbag structure 10 can be disposed in interior side panels of a vehicle positioned near passenger seats such that the airbag structure 10 inflates to substantially similar position adjacent the seat in the event of an impact event. However, the above alternative embodiments are merely provided for exemplary purposes, and as indicated above, embodiments are intended to cover any type of airbag structure disclosed above.

Embodiments are also intended to include or otherwise cover methods of using and methods of manufacturing the airbag structure 10 disclosed above. The methods of manufacturing include or otherwise cover processors and computer programs implemented by processors used to design various elements of the airbag structure 10 disclosed above. For example, embodiments are intended to cover processors and computer programs used to design or manufacture the lower and upper cushions 12, 14, and the sail 16 of the airbag structure 10 that can implement rapid fill techniques to cause enhanced inflation and proper orientation and positioning of the expanding and extending components of the airbag structure 10.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. An airbag assembly for protecting a vehicle occupant having a torso and a pelvis disposed in a vehicle seat, the airbag assembly comprising:
    a first inflatable chamber disposed in the vehicle seat and configured to expand outward from the vehicle seat to indirectly support the torso of the occupant;
    a second inflatable chamber disposed in the vehicle seat below the first inflatable chamber and configured to expand outward from the vehicle seat below the first inflatable chamber, the second inflatable chamber terminates at a front end, a rear end, a top end and a bottom end, the rear end is anchored to the vehicle seat, the front end is spaced away from the rear end when the second inflatable chamber is inflated, the top end extends from the front end to the rear end, and the rear end is closed to fluid communication with the first inflatable chamber; and
    a sheet connecting the first inflatable chamber to the second inflatable chamber, the sheet being configured to engage the torso of the occupant when the occupant is disposed in the vehicle seat.

2. The airbag assembly of claim 1, wherein the first inflatable chamber is configured to indirectly support a shoulder of the occupant, and the sheet is configured to engage the shoulder of the occupant.

3. The airbag assembly of claim 1, wherein the first inflatable chamber is configured to be spaced from the torso of the occupant and the second inflatable chamber is configured to engage the pelvis of the occupant.

4. The airbag assembly of claim 3, wherein the first inflatable chamber is configured to expand above the torso of the occupant.

5. The airbag assembly of claim 1, wherein the sheet is configured to be suspended between the first inflatable chamber and the second inflatable chamber.

6. The airbag assembly of claim 1, wherein the first inflatable chamber and the second inflatable chamber are spaced apart and configured to be separately inflated.

7. The airbag assembly of claim 1, wherein the first inflatable chamber, the second inflatable chamber and the sheet are configured to be stored as a unitary package in the vehicle seat.

8. The airbag assembly of claim 1, wherein the first inflatable chamber and the second inflatable chamber are disposed in a seatback portion of the vehicle seat.

9. An airbag system for protecting a vehicle an occupant having a torso and a pelvis disposed in a vehicle seat, the airbag assembly comprising:
    a first inflatable chamber disposed in the vehicle seat and configured to expand outward from the vehicle seat to indirectly support the torso of the occupant;
    a second inflatable chamber disposed in the vehicle seat below the first inflatable chamber and configured to expand outward from the vehicle seat below the first inflatable chamber;
    a third inflatable chamber connected to each of the first inflatable chamber and the second inflatable chamber, and the third inflatable chamber is spaced away from the vehicle seat when the first, second and third inflatable chambers are inflated;
    a sheet connecting the first inflatable chamber to the second inflatable chamber, the sheet being configured to engage the torso of the occupant when the occupant is disposed in the vehicle seat, and the sheet extends from each of the third inflatable chamber and the vehicle seat;
    a first inflator disposed in the vehicle seat and configured to inflate the first inflatable chamber; and
    a second inflator disposed in the vehicle seat and configured to inflate the second inflatable chamber.

10. The airbag system of claim 9, wherein the first inflatable chamber is configured to indirectly support a shoulder of the occupant, and the sheet is configured to engage the shoulder of the occupant.

11. The airbag system of claim 9, wherein the first inflatable chamber is configured to be spaced from the torso of the occupant and the second inflatable chamber is configured to engage the pelvis of the occupant.

12. The airbag system of claim 11, wherein the first inflatable chamber is configured to expand above the torso of the occupant.

13. The airbag system of claim 9, wherein the sheet is configured to be suspended between the first inflatable chamber and the second inflatable chamber.

14. The airbag system of claim 9, wherein the first inflatable chamber and the second inflatable chamber are spaced apart and configured to be separately inflated.

15. The airbag system of claim 9, wherein the first inflatable chamber, the second inflatable chamber and the sheet are configured to be stored as a unitary package in the vehicle seat.

16. The airbag system of claim 9, wherein the first inflatable chamber and the second inflatable chamber are disposed in a seatback portion of the vehicle seat.

17. An airbag assembly for protecting a vehicle occupant having a torso and a pelvis disposed in a vehicle seat, the airbag assembly comprising:
    a first inflatable chamber disposed in the vehicle seat and configured to expand outward from the vehicle seat to indirectly support the torso of the occupant;
    a second inflatable chamber disposed in the vehicle seat below the first inflatable chamber and configured to expand outward from the vehicle seat below the first inflatable chamber;
    a third inflatable chamber disposed in the vehicle seat connecting the first inflatable chamber and the second inflatable chamber and configured to expand outward from the vehicle seat between the first inflatable chamber and the second inflatable chamber; and a sheet outside of the first inflatable chamber and connecting the first inflatable chamber to the second inflatable chamber, the sheet being configured to engage the torso of the occupant when the occupant is disposed in the vehicle seat.

18. The airbag assembly of claim 17, wherein the first inflatable chamber is configured to indirectly support a shoulder of the occupant, and the sheet is configured to engage the shoulder of the occupant.

19. The airbag assembly of claim 17, wherein the third inflatable chamber is configured to be inflated with at least one of the first inflatable chamber and the second inflatable chamber.

20. The airbag assembly of claim 17, wherein the first inflatable chamber, the second inflatable chamber, the third inflatable chamber and the sheet are configured to be stored as a unitary package in the vehicle seat.

\* \* \* \* \*